INVENTOR.
Robert T. Palmer
BY Robert T. Palmer
Attorney

Oct. 17, 1950 R. T. PALMER 2,526,402
ELECTROSTATIC PRECIPITATOR
Filed Feb. 8, 1947 2 Sheets-Sheet 2

INVENTOR.
Robert T. Palmer
BY Robert T. Palmer
Attorney

Patented Oct. 17, 1950

2,526,402

UNITED STATES PATENT OFFICE 2,526,402

ELECTROSTATIC PRECIPITATOR

Robert T. Palmer, Sharon, Mass., assignor to Westinghouse Electric Corporation, East Pittsburgh, Pa., a corporation of Pennsylvania Application February 8, 1947, Serial No. 727,359

2 Claims. (Cl. 183—7)

This invention relates to electrostatic precipitators for removing small particles such as dust, from gases, such as air.

The most successful electrostatic precipitators for the removal of dust and other small foreign particles from air, utilize ionizer electrodes and separate collector electrodes. The ionizer electrodes usually comprise wires suspended between grounded, tubular electrodes. A direct current voltage which may be +12,000 volts, is applied to the wire electrodes which usually are supported by 12,000 volt insulators from the precipitator casings. The collector electrodes of such precipitators usually consist of two sets of plates, one set being grounded to the casing, a direct current voltage which may be +6,000 volts, being applied to the other set of plates which are supported by 6,000 volt insulators from the casing.

The 12,000 volt insulators are not only much more expensive than the 6,000 volt insulators are, but they occupy much more space. In such precipitators, the insulators usually are so supported from the interior of the casings that they protrude into the air passages therein.

This invention eliminates the necessity for the higher voltage insulators usually provided for supporting the ionizer wire electrodes of an electrostatic precipitator from the casing thereof, by supporting one set of collector electrodes from the casing by relatively low voltage insulators which may be 6,000 volt insulators, the tubular ionizer electrodes being connected to these electrodes, and by supporting the ionizer wires from the casing by similar insulators. A voltage which may be +6,000 volts, is applied to the ionizer wire electrodes, and a voltage which may be −6,000 volts, is applied to the set of collector electrodes which are insulated from the casing, and to which the tubular ionizer electrodes are connected, whereby there is a difference of potential of 12,000 volts between the wire and the tubular ionizer electrodes. The casing is grounded, the other set of collector electrodes being grounded to the casing.

A feature of this invention is that all of the insulators are located outside the passage through which the gas to be cleaned, flows.

Another feature of this invention is that the outer, negatively charged, collector electrodes extend between the ionizer electrodes, there being clearance openings in the ends of such outer electrodes for the passage therethrough of the wire electrodes, the supports for which are located external the space between the negatively charged electrodes. The tubular ionizer electrodes are attached to the negatively charged electrodes, between the wire electrodes. The said outer electrodes define the opposite sides of the air passage through the ionizing and collection areas, and since the ionizer wire supports are located external this space, they cannot weaken the electrostatic field between the wire and tubular electrodes, with the result that there is uniform ionization of all of the gas passing between the ionizer electrodes.

An object of the invention is to reduce the space required by the insulators in an electrostatic precipitator.

Another object of the invention is to place the insulators in an electrostatic precipitator outside the passage through which the gas to be cleaned, flows.

Another object of the invention is to provide in an electrostatic precipitator, uniform ionization of the gas to be cleaned.

The invention will now be described with reference to the drawing, of which:

Figure 1:
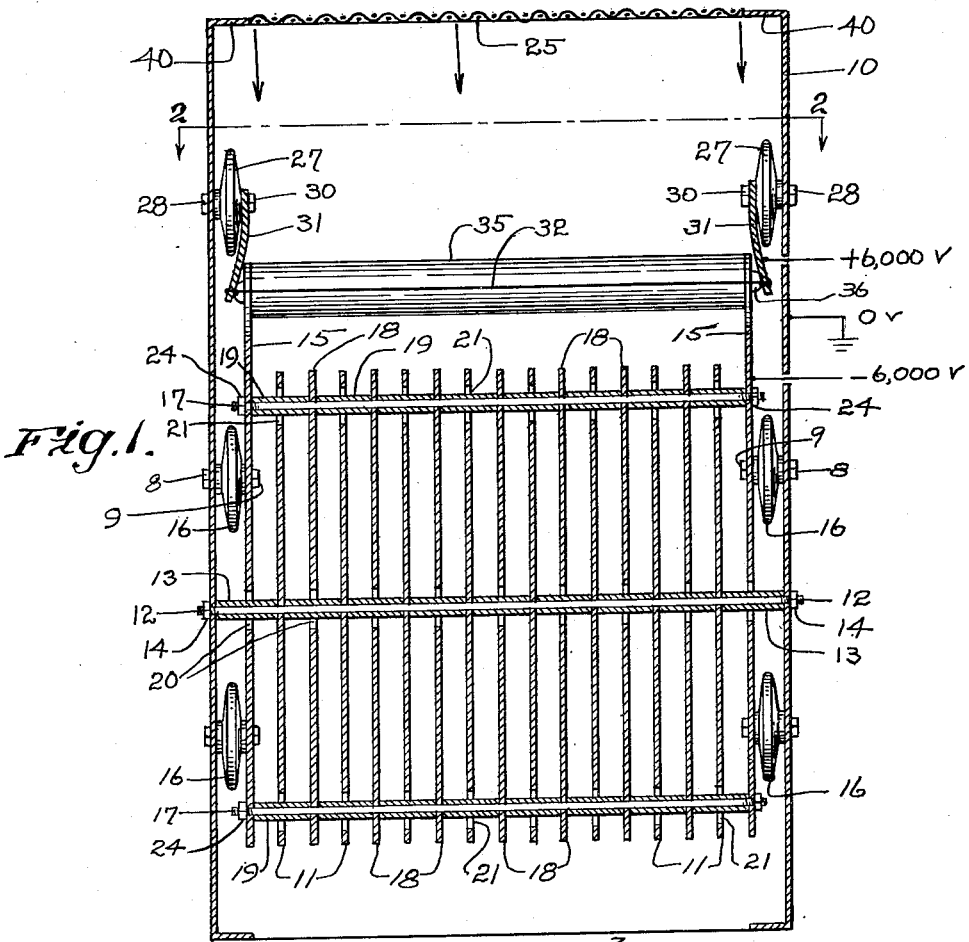
Fig. 1 is a side elevation, in section, of an electrostatic precipitator embodying this invention, the section being taken along the lines 1—1 of Fig. 3.

The electrostatic precipitator illustrated has the sheet metal casing 10 which is adapted to be grounded as is usual in such devices. The grounded collector electrodes 11 formed in the illustrated embodiment of the invention, as metal plates, are supported from the casing 10 by the cylindrical, metal rods 12 which extend through apertures therein. The cylindrical metal spacers 13 extend around the rods 12 between the adjacent electrodes 11 and between the outer electrodes 11 and the adjacent walls of the casing, and serve to space the electrodes 11 apart in parallel relationship, and to provide good electric contact between the electrodes 11 and the rods, the spacers fitting tightly around the rods, and contacting substantial surfaces of the electrodes 11. The ends of the rods 12 extend through the casing walls, and are threaded to receive the nuts 14, which when screwed up on the threaded ends of the rods, tighten the described electrode supports to the casing.

The two, outer charged electrodes 15, illustrated as metal plates, are supported from the casing 10 by the electric insulators 16 which have relatively large diameters, and relatively small thicknesses. The insulators 16 are attached to the casing 10 by the bolts 8, and the electrodes 15 are attached to the insulators 16 by the bolts 9. The inner, charged electrodes 18, are supported from the outer, charged electrodes 15 by the cylindrical, metal rods 17 which extend through apertures therein parallel to the rods 12. The cylindrical, metal spacers 19 extend around the rods 17 between the adjacent electrodes 18 and between the outer electrodes 18 and the electrodes 15, and serve to space the charged electrodes apart in parallel relationship, and to provide good electric contact between same and the rods 17, the spacers 19 fitting tightly around the rods 17, and contacting substantial surfaces of the charged electrodes.

The outer ends of the rods 17 are threaded where they extend through the electrodes 15, for receiving the nuts 24 which secure the described charged electrode assembly in position, when screwed up on the threaded rod ends against the outer surfaces of the electrodes 15.

The rods 12 and the spacers 13 therearound pass through the clearance holes 20 in the charged electrodes 15 and 18, the clearance holes being sufficiently large that there is no electrical leakage between the charged electrodes and the spacers.

The rods 17 and the spacers 19 therearound pass through the clearance holes 21 in the grounded electrodes 11, the clearance holes being sufficiently large that there can be no electrical leakage between the grounded electrodes and the spacers 19.

The upper ends of the outer electrodes 15 extend towards the gas inlet 25 in the upper portion of the casing 10, beyond the upper ends of the electrodes 11 and 18, and have the semi-circular cut-out portions 26 therein. The insulators 27, which preferably are similar to the insulators 16, are attached by the bolts 28 to the casing 10 above the upper ends of the outer electrodes 15. The frame-work 29 is attached by the bolts 30 to the insulators 27, and has the ionizer wire supporting arms 31 which extend downwardly below the centers of the cut-out portions 26, and which curve outwardly so that their lower ends extend between the upper ends of the outer electrodes 15 and the adjacent walls of the casing 10. The ionizer wires 32 are attached to the arms 31 so as to extend through the centers of the cut-out portions 26.

Figure 2:
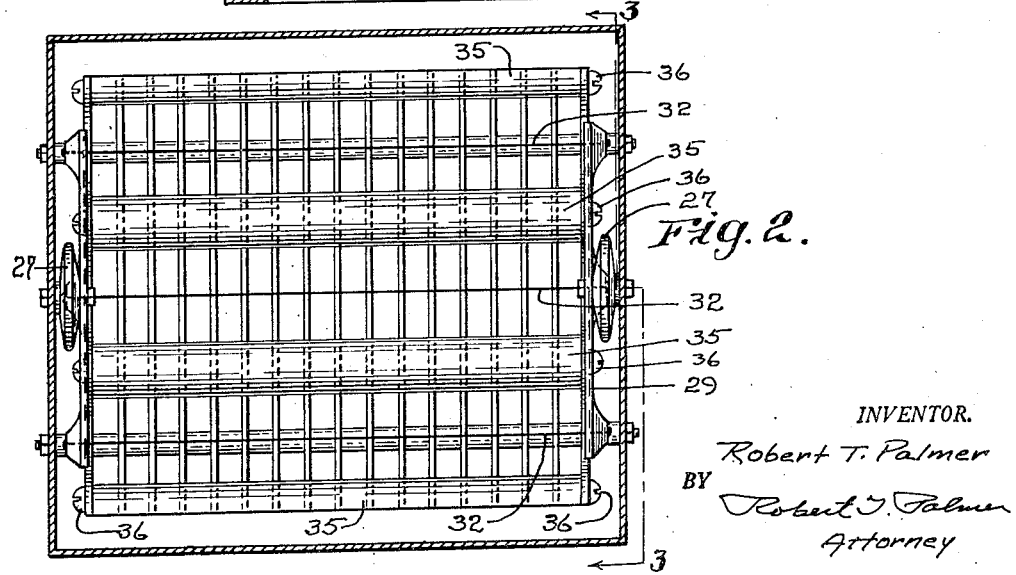
Fig. 2 is a sectional view along the lines 2—2 of Fig. 1.
Figure 3:
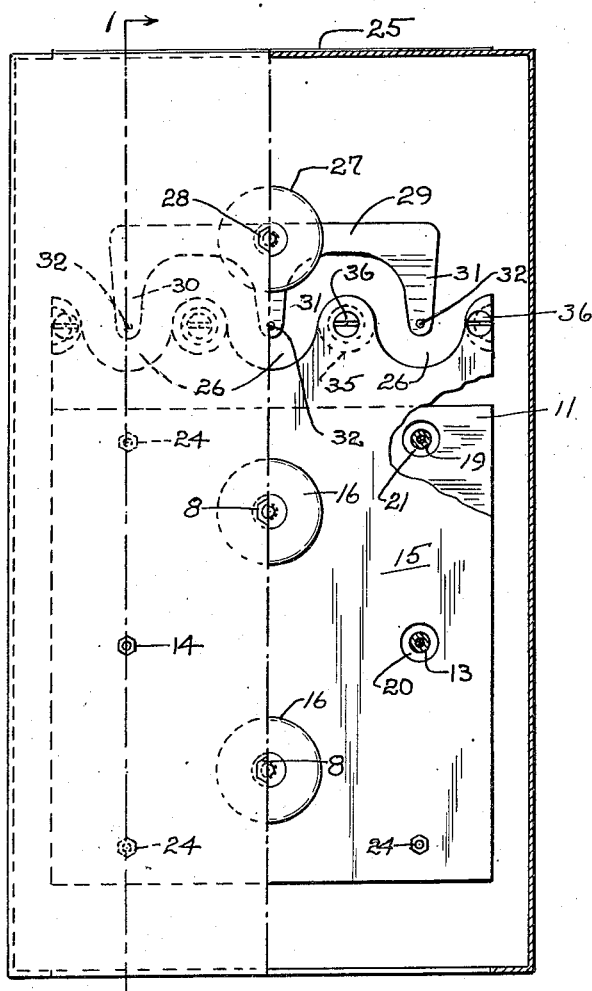
Fig. 3 is a sectional view along the lines 3—3 of Fig. 2.

The tubular, ionizer electrodes 35 extend between the outer electrodes 15, and are attached thereto by the screws 36. The two inner electrodes 35 are formed as cylinders while the two outer electrodes 35 are formed as halves of cylinders as illustrated by Figs. 2 and 3. The upper ends of the electrodes 15 at their areas of contact with the electrodes 35, are curved in similar circular arcs, the diameters of which are equal to the diameters of the electrodes 35, whereby the extreme upper ends of the electrodes 15 are in alignment with the upper surfaces of the electrodes 35 and hence are the same distances from the ionizer wires 32 as the electrodes 35 are.

As illustrated by Fig. 1, the ionizing wires 32 are adapted to be connected to the +6,000 volt terminal of a suitable, direct current, power supply; the casing 10 of the precipitator is adapted to be grounded and connected to the zero voltage terminal of the power supply, and the collector electrodes 15 and 18 are adapted to be connected to the —6,000 volt terminal of the power supply. The collector electrodes 11 are grounded to the casing as described.

The tubular, ionizer electrodes 35 through being connected to the electrodes 15 are at a potential of —6,000 volts with the result that the ionizer wires 32 are charged +12,000 volts with respect to the electrodes 35.

Figure 4:
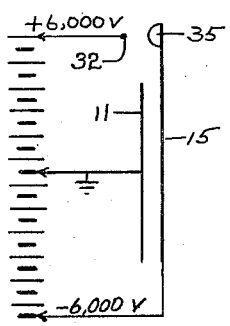
Fig. 4 is a circuit schematic illustrating power supply apparatus suitable for energizing the electrodes of the precipitator of Figs. 1–3.

There is a potential difference of 6,000 volts between the set of collector electrodes 11 and the set of collector electrodes including the electrodes 15 and 18. Fig. 4 illustrates diagrammatically the relations between the voltages applied to the various electrodes. In actual practice a power supply such as illustrated by Fig. 10 of the E. H. R. Pegg Patent No. 2,233,639 could be used, in which case the terminal marked P+ would be grounded and the terminal shown grounded at 106 would be the —6,000 volt terminal.

In operation the gas passing between the ionizer electrodes is ionized, the foreign particles entrained in the gas being given positive electrostatic charges in the process, as is understood by those skilled in the art, with the charged particles being attracted to the oppositely charged, collector electrodes 11.

The insulators 16 and 27 are located outside the gas stream passing through the collection zone passage defined on two sides by the outer collector electrodes 15. The casing 10 preferably would have the air inlet 25 so arranged that the wall portions 40 extend over the outer electrodes 15 whereby the gas flow as indicated by the arrows of Fig. 1, is in a passage extending between the outer electrodes, and thereby misses the insulators.

The insulators 16 and 27 are seen to be connected electrically in series for supplying the 12,000 voltage between the wire and tubular ionizer electrodes. Thus instead of requiring as in the usual construction, a set of 6,000 volt insulators for insulating the charged collector electrodes from the grounded casing, and a set of 12,000 volt insulators for insulating the ionizer wire electrodes from the casing, two sets of the lower voltage insulators can be used.

Through placing the ionizer wire supporting arms 31 outside the space between the outer collector electrodes 15 which support the tubular, ionizer electrodes 35, and by providing the cut-out portions 26 in the electrodes 15, centrally around the wire electrodes where they pass through the electrodes 15, the supporting structure does not interfere with the ionization of the gas passing between the ionizer electrodes with the result that there is equal ionization along the lengths thereof.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. An electrostatic precipitator comprising a casing, a pair of collector electrodes extending adjacent opposite walls of said casing, insulators between said electrodes and said walls for supporting said electrodes from said walls, relatively large ionizer electrodes in electrical contact with and supported from corresponding ends of said electrodes, said ends having cut-out portions therein between said relatively large electrodes, wire ionizer electrodes extending through said cut-out portions, and means including insulators attached to said casing for supporting said wire electrodes.

2. An electrostatic precipitator comprising a casing having a gas inlet, a pair of collector electrodes extending adjacent opposite walls of said casing, insulators between said electrodes and said walls for supporting said electrodes therefrom, other collector electrodes supported from said electrodes, grounded collector electrodes supported from said casing and electrically connected thereto, said pair of electrodes having corresponding ends extending beyond said other and said grounded electrodes towards said inlet, relatively large ionizer electrodes supported from said ends, wire ionizer electrodes between said relatively large electrodes, insulators between said ends and said inlet and attached to said casing, and means supporting said wire electrodes from said last mentioned insulators, said ends having cut-out portions between said relatively large electrodes, said wire electrodes extending into said cut-out portions.

ROBERT T. PALMER.

REFERENCES CITED

The following references are of record in the file of this patent:

UNITED STATES PATENTS

| Number | Name | Date |
| --- | --- | --- |
| 1,343,285 | Schmidt | June 15, 1920 |
| 2,225,677 | White | Dec. 24, 1940 |
| 2,347,709 | Penney | May 2, 1944 |
| 2,359,149 | Pegg | Sept. 26, 1944 |